(12) United States Patent
Meylan et al.

(10) Patent No.: US 8,831,658 B2
(45) Date of Patent: Sep. 9, 2014

(54) CONTROLLING APPLICATION ACCESS TO A NETWORK

(75) Inventors: Arnaud Meylan, San Diego, CA (US); Jay Kumar Sundararajan, San Diego, CA (US); Gerardo Giaretta, San Diego, CA (US); Prashanth Hande, Bridgewater, CA (US); Arvind V. Santhanam, San Diego, CA (US); Satashu Goel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 222 days.

(21) Appl. No.: 13/288,931

(22) Filed: Nov. 3, 2011

(65) Prior Publication Data

US 2012/0214527 A1 Aug. 23, 2012

Related U.S. Application Data

(63) Continuation-in-part of application No. 13/028,081, filed on Feb. 15, 2011.

(60) Provisional application No. 61/511,980, filed on Jul. 26, 2011, provisional application No. 61/503,395, filed on Jun. 30, 2011, provisional application No. 61/454,457, filed on Mar. 18, 2011, provisional application No. 61/410,858, filed on Nov. 5, 2010.

(51) Int. Cl.
*H04B 7/00* (2006.01)
*H04L 12/54* (2013.01)
*H04L 29/08* (2006.01)
(Continued)

(52) U.S. Cl.
CPC ....... *H04L 12/5692* (2013.01); *H04M 1/72519* (2013.01); *H04W 52/0216* (2013.01); *H04W 36/14* (2013.01); *H04W 52/02* (2013.01); *H04L 69/32* (2013.01); *G06F 9/5011* (2013.01); *H04W 80/08* (2013.01); *H04L 69/161* (2013.01); *H04L 12/12* (2013.01); *H04L 69/162* (2013.01); *H04W 4/003* (2013.01); *H04W 48/06* (2013.01); *H04W 48/18* (2013.01); *H04W 80/04* (2013.01); *H04W 80/06* (2013.01); *H04W 88/06* (2013.01)
USPC ............................ 455/509; 455/442; 370/392

(58) Field of Classification Search
CPC ...... H04W 64/00; H04W 88/10; H04W 88/12
USPC ........................................................ 455/509
See application file for complete search history.

(56) References Cited

U.S. PATENT DOCUMENTS 6,115,744 A 9/2000 Robins et al.
6,122,514 A 9/2000 Spaur et al.
(Continued)

FOREIGN PATENT DOCUMENTS

EP 2019517 A1 1/2009
WO 03036491 A1 5/2003
(Continued)

OTHER PUBLICATIONS

Ananthanarayaran G., et al ., "A New Communications API", Electrical Engineering and Computer SciencesUniversity of California at Berkeley, May 25, 2009, pp. 1-14, XP002676108, Retrieved from the Internet: URL:http://www.eecs.berkeley.edu/Pubs/Tech Rpts/2009/EECS-2009-84.pdf [retrieved on May 16, 2012].

(Continued)

*Primary Examiner* — Ajibola Akinyemi
(74) *Attorney, Agent, or Firm* — Abdollah Katbab

(57) ABSTRACT

A method of wireless communication includes intercepting a request from an application desiring use of communication resources. The intercepted request is held and is then evaluated to determine whether the held request can be released. The held request is released based on the outcome of the evaluation.

22 Claims, 12 Drawing Sheets

(51) Int. Cl.

| | | |
|---|---|---|
| *G06F 9/50* | (2006.01) | |
| *H04W 48/18* | (2009.01) | |
| *H04M 1/725* | (2006.01) | |
| *H04W 52/02* | (2009.01) | |
| *H04W 36/14* | (2009.01) | |
| *H04W 80/08* | (2009.01) | |
| *H04L 29/06* | (2006.01) | |
| *H04L 12/12* | (2006.01) | |
| *H04W 4/00* | (2009.01) | |
| *H04W 48/06* | (2009.01) | |
| *H04W 80/04* | (2009.01) | |
| *H04W 80/06* | (2009.01) | |
| *H04W 88/06* | (2009.01) | |

(56) References Cited

U.S. PATENT DOCUMENTS

| | | | |
|---|---|---|---|
| 7,251,490 B2 * | 7/2007 | Rimoni | 455/436 |
| 7,486,954 B2 * | 2/2009 | Lee et al. | 455/442 |
| 7,664,838 B2 | 2/2010 | Monga et al. | |
| 7,769,887 B1 | 8/2010 | Bhattacharyya et al. | |
| 7,860,469 B2 | 12/2010 | Mohanty et al. | |
| 2002/0095524 A1 | 7/2002 | Sanghvi et al. | |
| 2003/0134632 A1 | 7/2003 | Loughran | |
| 2004/0009751 A1 | 1/2004 | Michaelis et al. | |
| 2004/0158729 A1 | 8/2004 | Szor | |
| 2004/0264396 A1 | 12/2004 | Ginzburg et al. | |
| 2005/0149376 A1 | 7/2005 | Guyan et al. | |
| 2006/0155856 A1 | 7/2006 | Nakashima et al. | |
| 2006/0217116 A1 | 9/2006 | Cassett et al. | |
| 2006/0221953 A1 | 10/2006 | Basso et al. | |
| 2007/0174469 A1 | 7/2007 | Andress et al. | |
| 2007/0178876 A1 | 8/2007 | Yaqub et al. | |
| 2007/0201369 A1 | 8/2007 | Pedersen et al. | |
| 2007/0245171 A1 | 10/2007 | Ohly et al. | |
| 2007/0286222 A1 | 12/2007 | Balasubramanian | |
| 2007/0294410 A1 | 12/2007 | Pandya et al. | |
| 2008/0019339 A1 | 1/2008 | Raju et al. | |
| 2008/0183857 A1 | 7/2008 | Barfield et al. | |
| 2008/0234012 A1 | 9/2008 | Liu et al. | |
| 2009/0005127 A1 | 1/2009 | Frenger et al. | |
| 2009/0022095 A1 * | 1/2009 | Spaur et al. | 370/329 |
| 2009/0049518 A1 | 2/2009 | Roman et al. | |
| 2009/0183186 A1 | 7/2009 | Murtagh | |
| 2009/0318124 A1 | 12/2009 | Haughn | |
| 2009/0325525 A1 | 12/2009 | Granlund et al. | |
| 2010/0144332 A1 | 6/2010 | Savoor | |
| 2010/0231383 A1 | 9/2010 | Levine et al. | |
| 2010/0279745 A1 | 11/2010 | Westcott et al. | |
| 2010/0285776 A1 | 11/2010 | de Froment | |
| 2010/0287281 A1 | 11/2010 | Tirpak | |
| 2010/0322124 A1 | 12/2010 | Luoma et al. | |
| 2011/0003592 A1 | 1/2011 | Matsumoto | |
| 2011/0028085 A1 | 2/2011 | Waung et al. | |
| 2011/0054879 A1 | 3/2011 | Bogsanyl et al. | |
| 2011/0149797 A1 | 6/2011 | Taaghol et al. | |
| 2011/0182220 A1 | 7/2011 | Black et al. | |
| 2011/0185202 A1 | 7/2011 | Black et al. | |
| 2011/0188394 A1 | 8/2011 | Seo | |
| 2011/0201285 A1 | 8/2011 | Giaretta et al. | |
| 2012/0020266 A1 | 1/2012 | Sun et al. | |
| 2012/0129503 A1 | 5/2012 | Lindeman et al. | |
| 2012/0134361 A1 * | 5/2012 | Wong et al. | 370/392 |
| 2012/0185577 A1 | 7/2012 | Giaretta et al. | |
| 2012/0236772 A1 | 9/2012 | Kondratiev | |
| 2012/0257512 A1 * | 10/2012 | Lim | 370/242 |
| 2012/0270538 A1 | 10/2012 | Meylan et al. | |
| 2013/0052965 A1 | 2/2013 | Meylan et al. | |
| 2013/0053013 A1 | 2/2013 | Giaretta et al. | |
| 2013/0165181 A1 | 6/2013 | Hasegawa | |
| 2013/0217331 A1 | 8/2013 | Manente | |
| 2013/0217357 A1 | 8/2013 | Menezes et al. | |
| 2013/0225100 A1 | 8/2013 | Chen et al. | |

FOREIGN PATENT DOCUMENTS

| | | |
|---|---|---|
| WO | WO2011103203 | 8/2011 |
| WO | 2011146831 A1 | 11/2011 |

OTHER PUBLICATIONS

Andrea Passarella: "Power Management Policies for Mobile Computing", Feb. 1, 2005, pp. 1-151, XP055019616, Retrieved from the Internet: URL:http://cnd.iit.cnr.it/andrea/docs/passarella_phd_thesis.pdf [retrieved-on Feb. 16, 2012] * chapter 5.3, 5.3.1.

Chen L., et al., "QoS aware power efficiency in IEEE 802.11 LAN", Consumer Communications and Networking Conference, 2005. CCNC. 2005 Second IEEE, IEEE, Piscataway, NJ, USA, Jan. 3, 2005, pp. 85-90, XP010787616, DOI: 10.1109/CCNC.2005. 1405149, ISBN: 978-0-7803-8784-3 * chapter III C * figures 3-2.

Hare, et al., "A Network-Assisted System for Energy Efficiency in Mobile Devices," 2011 Third International Conference on Communication Systems and Networks, COMSNETS, pp. 1-10, Jan. 2011.

International Search Report and Written Opinion—PCT/US2011/059441—ISA/EPO—Feb. 24, 2012.

Liu China MOB1 Le Yuri Ismai Lov Ericsson Z Cao China Mobile D: "Socket API Extension for MIF Host; draft-liu-mif-api-extension-03.txt", Socket API Extension for MIF Host; Draft-LIU-MI F-API-Extension-03.TXT, Internet Engineering Task Force, IETF; Standardworkingdraft, Internet Society (ISOC) 4, Rue Des Falaises CH—1205 Geneva, Switzerland, No. 3, Oct. 25, 2010, pp. 1-8, XP015072273, [retrieved on Oct. 25, 2010] abstract * chapters 3-7 * figure 1.

Liu China Mobile Yuri Ismailov Ericsson Z Cao China Mobile D: "Socket API Extension for MIF Host; draft-liu-mif-api-extension-04.txt", Socket API Extension for MIF Host; Draft-LIU-MIF-API-Extension-04.TXT, Internet Engineering Task Force, IETF; Standardworki Ngdraft, Internet Society (ISOC) 4, Rue Des Falaises CH—1205 Geneva, Switzerland, No. 4, Mar. 15, 2011, pp. 1-9, XP015074974, [ retrieved on Mar. 15, 2011] abstract *chapter 3-5 * figure 1.

Liu H., et al: "TailTheft: Leveraging the Wasted Time for Saving Energy in Cellular Communications", MobiArch '11 Proceedings of the sixth international workshop on MobiArch Jun. 28, 2011, pp. 31-36, XP002676107, ISBN: 978-1-4503-0740-6 Retrieved from the Internet: URL:http://delivery.acm.org/10.1145/2000000/1999925/p31-liu.pdf"ip=145.64.134.245&acc=ACTIVE%20SERVICE&CFID=103451177&CFTOKEN=63558822&_acm_=1337160633_c5b6dc53c6b1c9 77ac53b9dfb0180831 [retrieved on May 16, 2012].

Kravets R et al: "Application-Driven Power Management for Mobile Communication" Wireless Networks, ACM, New York, NY, US, vol. 6, No. 4, Sep. 2000, pp. 263-277, XP001036334 ISSN: 1022-0038.

* cited by examiner

CONTROLLING APPLICATION ACCESS TO A NETWORK

CROSS-REFERENCE TO RELATED APPLICATIONS

This application claims the benefit under 35 U.S.C. §119 (e) to U.S. Provisional Patent Application No. 61/511,980 entitled "Connectivity Management for Applications on a User Device Through a Randomized Delay," filed on Jul. 26, 2011, to U.S. Provisional Patent Application No. 61/503,395 entitled "Controlling Application Access to a Network," filed on Jun. 30, 2011, to U.S. Provisional Patent Application No. 61/454,457 entitled "Connectivity Management for Applications on a User Device," filed on Mar. 18, 2011, to U.S. Provisional Patent Application No. 61/410,858 entitled "Apparatus and Methods for Scheduling Communication Sessions," filed on Nov. 5, 2010, and to U.S. patent application Ser. No. 13/288,928 entitled "SYSTEMS AND METHODS FOR SYNCHRONIZATION OF APPLICATION COMMUNICATIONS," the disclosures of which are expressly incorporated by reference herein in their entireties.

This application is a continuation-in-part of U.S. patent application Ser. No. 13/028,081 entitled "Methods and Apparatus Providing Intelligent Radio Selection For Legacy and Non-Legacy Applications," filed on Feb. 15, 2011, the disclosure of which is expressly incorporated by reference herein in its entirety.

BACKGROUND

1. Field

The present application relates generally to the operation of wireless communication systems, and more particularly, to methods and apparatus for managing connectivity resources for applications on a user device.

2. Background

Applications (Apps) or device applets are now available that operate to provide a wide range of add-on services and features to wireless devices. For example, it is now possible for wireless devices to download and launch device applets to perform value added functions such as, shopping, searching, position location, driving navigation or an array of other functions. Network and application providers generally offer these device applets to device users for additional fees. Thus, the use of device applets increases the functionality and usability of wireless devices and offers device users features and convenience not originally available on the devices themselves.

Typically a wireless device interfaces with one or more communication networks using any of a plurality of radios. For example, the wireless device may include a variety of radios providing communications using cellular, WiFi, Bluetooth or other types of radio access technologies. Accordingly, applications executing on the wireless device are typically provided with a default routing that determine the radio and associated radio channel the applications will use to communicate with the appropriate network.

However, there is an increased interest in intelligently selecting the radio through which a given application communicates. This is due, in part, to an increase in the number of multi-radio devices (e.g. 3G/WiFi devices) and an increase in network traffic that can create capacity problems for operators. Thus, with respect to such capacity problems, it would be desirable to offload traffic to alternative radios where such offloading is possible and does not significantly degrade application performance or where application performance actually may be improved based on intelligent radio selection.

Unfortunately, proposed solutions to affect radio selection may be inefficient, costly and may not be applicable to legacy applications. For example, one proposed solution would require all applications to be changed to explicitly indicate a preferred radio for use. This solution would be very inefficient and costly in that applications at each wireless device would need to be upgraded to specify a radio preference and would have to account for radio resources available at each device. Furthermore, such a solution may not be feasible with legacy applications where such upgrades are not possible.

Therefore, it would be desirable to have an efficient and cost effective mechanism that operates to provide intelligent radio selection for both legacy and non-legacy applications so that each application utilizes the most desirable radio available.

SUMMARY

In one aspect, a method of wireless communication is disclosed. The method includes intercepting a request from an application desiring use of communication resources and holding the intercepted request. The method also includes evaluating whether the held request can be released, and then releasing the held request based on an outcome of the evaluation.

In another aspect, the time for evaluating and/or the outcome of the evaluation may be functions of air link efficiency, network indications, location, context awareness, time of the day, present network load, past network load pattern, and/or a randomized wait time.

Another aspect discloses wireless communication having a memory and at least one processor coupled to the memory. The processor(s) is configured to intercept a request from an application desiring use of communication resources. The processor(s) is also configured to hold the intercepted request and to evaluate whether the held request can be released. The processor(s) releases the request based on an outcome of the evaluation.

In another aspect, an apparatus includes means for intercepting a request from an application desiring use of communication resources. The apparatus also includes means for holding the intercepted request and means for evaluating whether the held request can be released. The apparatus also has means for releasing the held request based on an outcome of the evaluation.

Another aspect discloses a computer program product for wireless communications in a wireless network. The computer readable medium has program code recorded thereon which, when executed by the processor(s), causes the processor(s) to perform operations of intercepting a request from an application desiring use of communication resources and holding the intercepted request. The program code also causes the processor(s) to evaluate whether to the held request can be released. The program code also causes the processor(s) to release the held request based on an outcome of the evaluation.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The foregoing aspects described herein will become more readily apparent by reference to the following description when taken in conjunction with the accompanying drawings wherein.

DESCRIPTION

The following description describes implementations of an intelligent radio selection system that operates to provide intelligent radio selection for both legacy and non-legacy applications so that each application utilizes the most desirable radio available.

The techniques described herein may be used for various wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, etc. The terms "networks" and "systems" are often used interchangeably. A CDMA network may implement a radio technology such as universal Terrestrial radio access (UTRA), CDMA2000, etc. UTRA includes Wideband-CDMA (W-CDMA) and low chip rate (LCR). CDMA2000 covers IS-2000, IS-95 and IS-856 standards. A TDMA network may implement a radio technology such as global system for mobile communications (GSM). An OFDMA network may implement a radio technology such as Evolved UTRA (E-UTRA), IEEE 802.11, IEEE 802.15, IEEE 802.16, IEEE 802.20, Flash-OFDM®, etc. UTRA, E-UTRA, and GSM are part of universal mobile telecommunication system (UMTS). Long term evolution (LTE) is an upcoming release of UMTS that uses E-UTRA. UTRA, E-UTRA, GSM, UMTS and LTE are described in documents from an organization named "3rd generation partnership project" (3GPP). CDMA2000 is described in documents from an organization named "3rd generation partnership project 2" (3GPP2). These various radio technologies and standards are known in the art.

Figure 1:
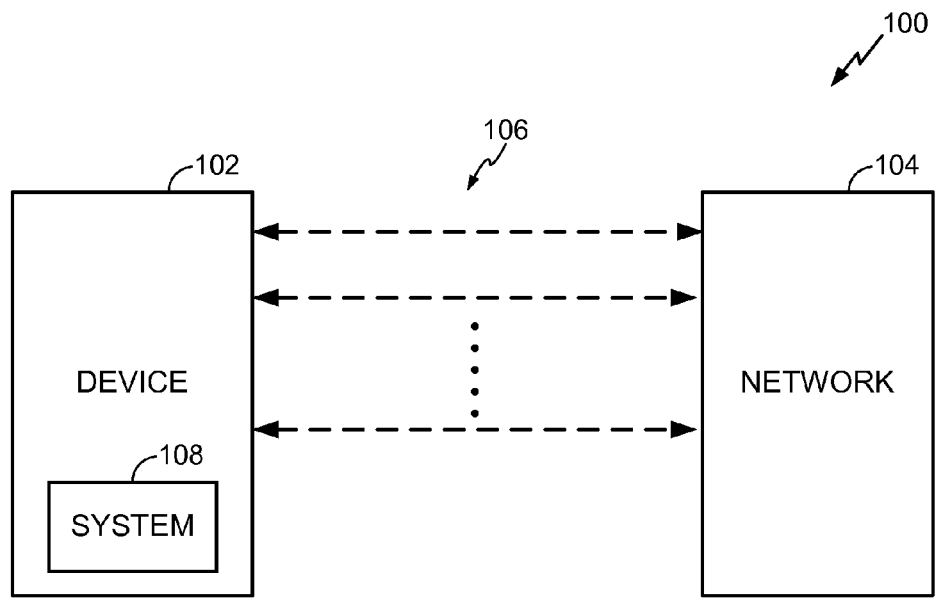
FIG. 1 shows an exemplary network environment illustrating aspects of an intelligent radio selection system.

FIG. 1 shows an exemplary network environment 100 illustrating aspects of an intelligent radio selection system. The network environment 100 comprises device 102 and communication network 104. The device 102 comprises a plurality of radios to communicate with the network 104 using corresponding radio channels 106. The device 102 also comprises an intelligent radio selection system 108 that operates to select a particular radio to be used by a particular application.

During operation, the device 102 executes applications which can interface with the network 104 using any of the plurality of radios. For example, an executing application issues a networking function call, such as a socket layer call, to request a network resource for communication with the network 104. Conventional systems typically process the socket layer call based on a default routing configuration to bind a pre-determined radio resource to the application.

However, in various implementations, the intelligent radio selection system operates to intercept the networking function call from the application and select the appropriate radio for use by the application. A binding process is then performed to bind the application to the network resource (i.e., the radio that has been selected). Since the intelligent radio selection system performs in response to the normal operations of the applications to use a radio resource, the system can operate with both legacy and non-legacy applications without any application changes or upgrades. A more detailed description of the intelligent radio selection system is provided below.

Figure 2:
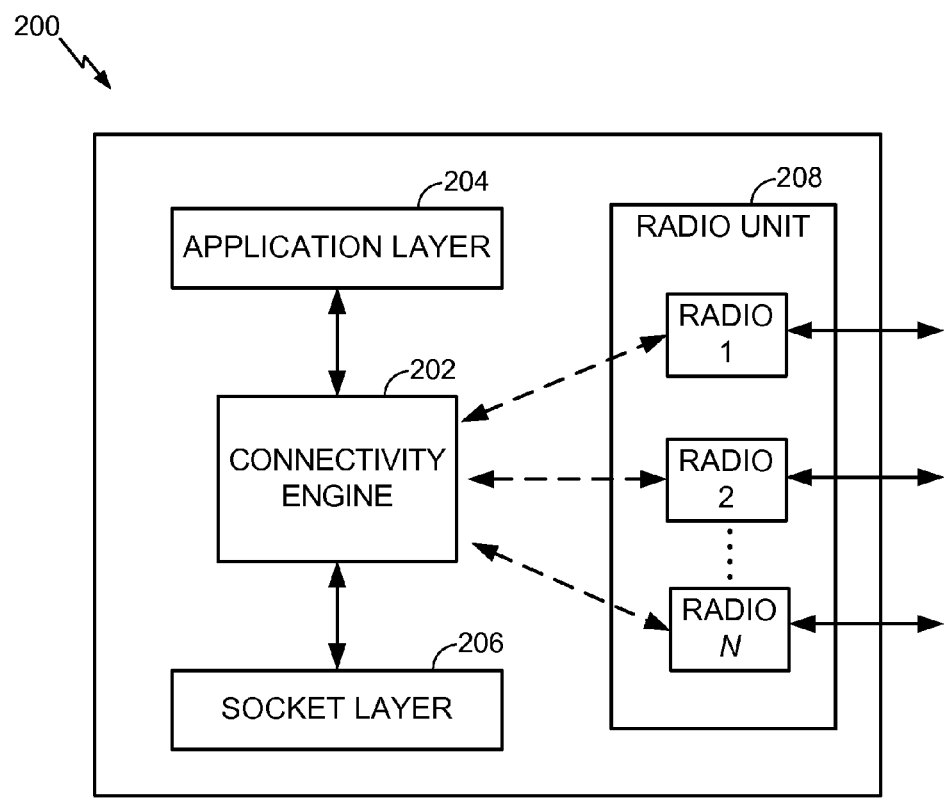
FIG. 2 shows an exemplary device architecture for intelligent radio selection.

FIG. 2 shows an exemplary device architecture 200 providing an intelligent radio selection system. The architecture 200 comprises connectivity engine 202, application layer 204, socket layer 206, and radio unit 208. The application layer 204 comprises applications which may execute to provide various functions and communicate with outside networks using one or more of the radios of the radio unit 208. The socket layer 206 issues calls (or requests) to establish a binding between a particular application and a radio. The connectivity engine 202 operates to provide intelligent radio selection in accordance with the various aspects presented herein.

During operation, the connectivity engine 202 intercepts networking function calls, such as socket layer calls, from an application at the application layer 204. Once the networking function calls are intercepted, the connectivity engine 202 operates to select an ideal radio/interface from the plurality of candidate radios within radio unit 208. For example, the connectivity engine 202 selects the radio based on a variety of selection criteria. When a radio/interface is selected, the connectivity engine 202 uses socket layer functions of the socket layer 206 to establish a connection between the application and the radio/interface that has been selected. For example, the socket layer functions may include a connect function "Connect( )", a bind function "Bind( )", a set socket option function "Setsockopt( )", and/or any other suitable socket layer functions.

Thus, the device architecture 200 provides for intelligent radio selection so that both legacy and non-legacy applications executing at a device can be bound to the most preferred radio/interface.

Figure 3:
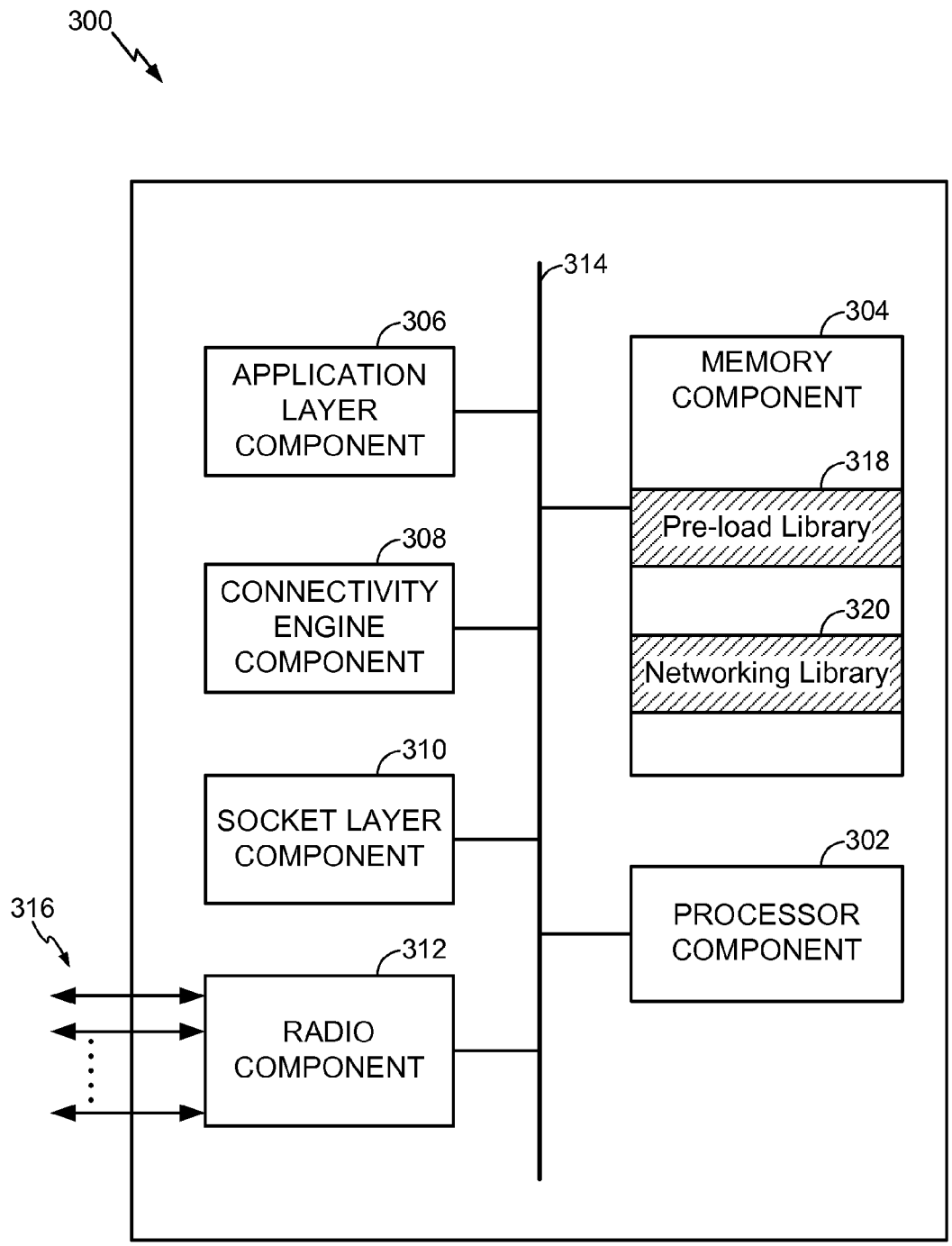
FIG. 3 shows an exemplary device configured to provide intelligent radio selection.

FIG. 3 shows an exemplary wireless device 300 providing intelligent radio selection. The device 300 comprises processor 302, memory 304, radio component 312, application layer component 306, socket layer component 310, and connectivity engine component 308 all coupled to communicate using communication bus 314. It should be noted that the device 300 is just one implementation and that other implementations are possible.

In one aspect, processor 302 comprises at least one of a CPU, processor, gate array, hardware logic, memory elements, and/or hardware executing software. The processor 302 operates to control the operation of the device 300 so that applications executing at the device 300 can be bound to the most desirable radio. In one implementation, the processor 302 is configured to execute computer-readable instructions related to performing any of a plurality of functions. For example, the processor 302 operates to analyze information received or communicated from the device 300 to effectuate intelligent radio selection. In another aspect, the processor 302 operates to generate information that can be utilized by the memory 304, radio component 312, application layer component 306, socket layer component 310, and/or connectivity engine component 308 to effectuate intelligent radio selection.

The radio component 312 comprises hardware and/or a processor executing software that is configured to provide a plurality of radios/interfaces that can be used to interface the device 300 with a plurality of external entities, such as external communication networks using a plurality of radio channels 316. For instance, radio component 312 provides radios/interfaces to communicate using cellular, WiFi, Bluetooth, or any other technologies to communicate with communication networks using the radio channels 316.

The application layer component 306 comprises hardware and/or a processor executing software that is configured to store and/or execute one or more applications on the device 300. In one implementation, the application layer component 306 is configured to allow applications to initiate networking function calls to request networking services, such as requesting connection to a radio/interface for the purpose of communicating with an external network or system.

The socket layer component 310 comprises hardware and/or a processor executing software that is configured to perform socket layer functions. In one implementation, the socket layer functions comprise such functions as Connect( ), Bind( ), and Setsockopt( ). A Connect( ) function operates to establish a connection between an application and a particular radio/interface. For example, the particular radio/interface can be selected from the plurality of candidate radios provided by the radio component 312. In an aspect, socket layer component 310 is configured to perform a variety of socket layer functions or commands.

The connectivity engine component 308 comprises hardware and/or a processor executing software that is configured to perform an assessment of system resources to select a particular radio for use by an application. In various implementations, the connectivity engine component 308 is configured as a centralized radio controller to select the particular radio based on one or more of the following selection criteria, such as, but not limited to user policy, operator policy, radio metrics, application requirements, network usability, vendor supplied metrics, and access point availability.

User policy may include the policy set by the device user regarding radio access by applications executing at the device. Operator policy may include the policy set by network operates regarding network access by devices or applications. Radio metrics may include the measurements of radio performance or other types of measurements that are used to select the most preferred radio for a particular application or operating environment. Application requirements may include the requirements associated with requesting applications, such as bandwidth requirements or latency/performance requirements. Network usability may include the information regarding the availability of a particular network on a particular radio interface. Vendor supplied metrics may include information to translate from radio metrics such as Receive Signal Strength Indication and Packet Loss Rate to the throughput and latency available for a particular radio interface. Access point availability may include information specifying the unique identifier for access points congested by lots of traffic from other devices or those that can configure a radio link but do not forward packets to the network.

The memory 304 comprises RAM, ROM, EEPROM or any other type of memory device that operates to allow information to be stored and retrieved at the device 300. In one implementation, the memory 304 is configured to store computer-readable instructions executed by processor 302. Memory 304 may also be configured to store any of a plurality of other types of data including data generated by any of the processor 302, radio component 312, application layer component 306, socket layer component 310, and/or connectivity engine component 308. Memory 304 can be configured in a number of different configurations, including as random access memory, battery-backed memory, hard disk, magnetic tape, etc. Various features can also be implemented upon memory 304, such as compression and automatic back up.

The memory 304 is configured to store a pre-load library 318 and a networking library 320. In one implementation, the networking library 320 comprises the POSIX or Berkeley sockets application programming interface (API) that includes functions for developing applications in the C programming language that perform inter-process communication, most commonly for communications across a computer network. For example, the POSIX API comprises functions, such as Connect( ), Bind( ), and Setsockopt( ).

The pre-load library 318 is used to intercept socket calls from applications at the application layer 306. For example, the pre-load library 318 comprises at least a subset of the API functions provided by the networking library 320, and is linked into the execution environment at a higher priority than the networking library 320.

During operation, the system configures the environment that a linker uses when the device first boots up. In one implementation, the linker operates to check the environment for libraries to load before starting normal library linking. Typically, the linker loads the networking library 320 that provides the networking API. Applications use that interface to create and connect sockets to establish network communications. For example, in one implementation, the linker scans an application and its dependencies so everything is loaded into memory. The linker is configured to load the pre-load library 318 before other libraries and populates the look-ups so libraries loaded subsequently are satisfied and can use the pre-load library 318.

The pre-load library 318 comprises at least a subset of the API sockets that the networking library 320 provides. When the application makes a networking function call to create or connect a socket, this call is processed (or intercepted) by the pre-load library 318. For example, the application provides a function pointer for the Connect( ) function with arguments or attributes, such as an IP Address, Destination, and File Descriptor that are provided to the Connect( ) function.

The pre-load library 318 then generates a request to a centralized radio control entity to choose the most appropriate network interface for the specified connection. For example, the pre-load library 318 sends the request to the connectivity engine component 308 to determine the appropriate radio to be used. After the appropriate radio is selected, calls to the networking library 320 sockets API are performed to complete the connection setup before control is returned to the pre-load library 318. For example, the connectivity engine component 308 operates to call functions of the networking library 320 to bind the radio that has been selected to the requesting application.

The connectivity engine component 308 is configured to intelligently select a radio from the plurality of candidate radios in various ways. For example, the connectivity engine component 308 may be configured to select a radio using one or more of the above selection criteria. Once a radio is selected, the connectivity engine component 308 binds the radio to the application. For example, in one implementation, binding is performed by calling into the original networking library 320. The runtime linker provides an expert interface where it is possible to specify specific library identifiers and function identifiers and store this information. Thus, functions at the connectivity engine component 308 and the pre-load library 318 can easily access functions, such as a Bind( ) function, in the networking library 320 to bind the radio that has been selected to the application. A more detailed description of the operation of the device 300 to provide intelligent radio selection is provided below.

In various implementations, the intelligent radio selection system comprises a computer program product having one or more program instructions ("instructions") or sets of "codes" stored or embodied on a computer-readable medium. When the codes are executed by at least one processor, for instance, processor 302, their execution causes the processor 302 to control the device 300 to provide the functions of the intelligent interface selection system described herein. For example, the computer-readable medium comprises a floppy disk, CDROM, memory card, FLASH memory device, RAM, ROM, or any other type of memory device or computer-readable medium that interfaces to the device 300. In another aspect, the sets of codes may be downloaded into the device 300 from an external device or communication network resource. The sets of codes, when executed, operate to provide aspects of the intelligent interface selection system described herein.

Figure 4:
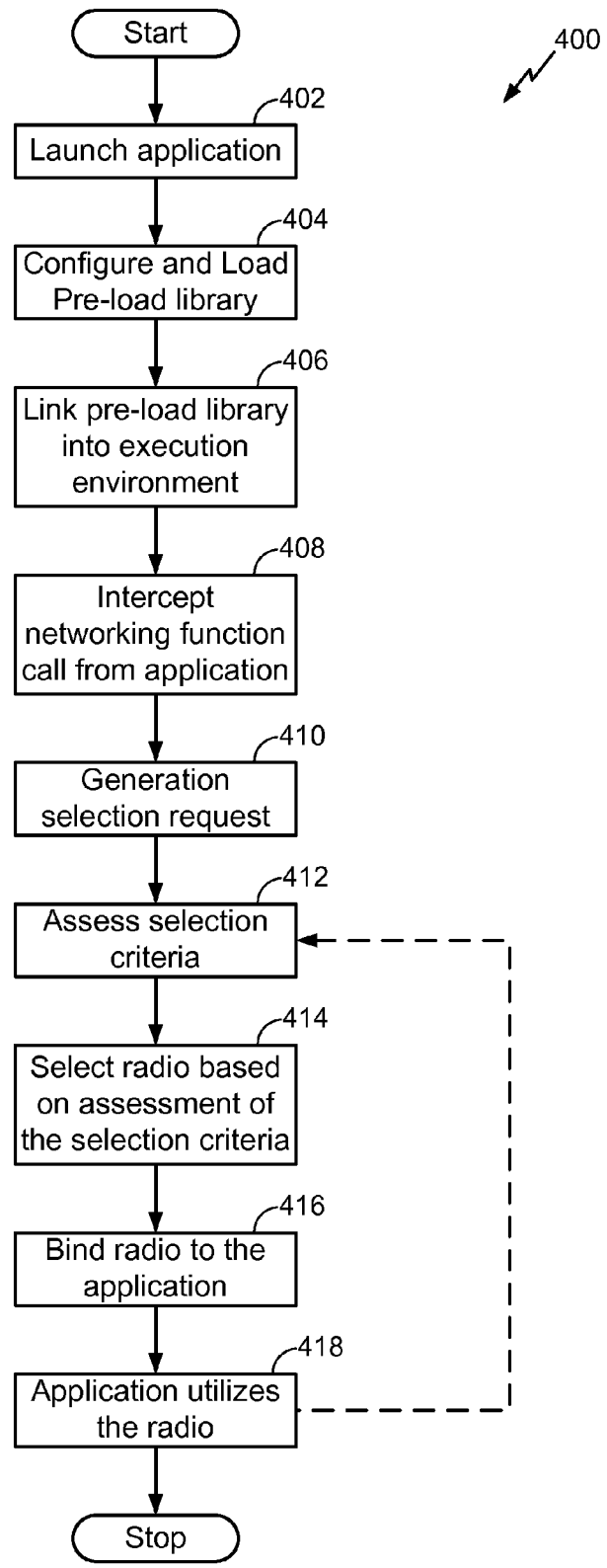
FIG. 4 shows an exemplary method for providing intelligent radio selection.

FIG. 4 shows an exemplary method 400 for providing intelligent radio selection. For clarity, the method 400 is described below with reference to the device 300 shown in FIG. 3. In one implementation, the processor 302 executes one or more sets of codes to control the functional elements of the device 300 to perform the functions described below.

At block 402, an application is launched. The application may be a legacy or non-legacy application that is part of the application layer component 306. For example, the application may be a network browser that generates a networking function call to connect to a wireless network using a radio available at the radio component 312.

At block 404, a pre-load library is configured and loaded. For example, the pre-load library 318 comprises a subset of the networking functions that are provided in the networking library 320 typically used by applications to assess communication networks. The networking functions in the pre-load library 318 are configured to intercept networking function calls from applications executing at a device. For example, the pre-load library 318 comprises POSIX socket functions that can be used to intercept socket calls by applications executing at the device 300. In one implementation, the pre-load library 318 in stored in memory 304.

In one implementation, the pre-load library 318 functions are configured to receive arguments passed from calling applications and use these arguments to generate a request to the connectivity engine component 308 to select the radio best suited for the application's purpose.

At block 406, the pre-load library is linked into the execution environment. For example, the processor 302 links the pre-load library 318 into the execution environment at a higher priority than the networking library 320. Thus, networking functions calls by applications will be intercepted and processed by functions in the pre-load library 318 and not processed by similar functions in the networking library 320.

At block 408, a networking function call from the application is intercepted. For example, the networking function call may be a POSIX socket function call, such as the Connect( ) function. The application generates the networking function call to connect to a radio to allow communication with external networks. Due to the linking of the pre-load library 318 into the execution environment at a higher priority than the networking library 320, the networking function call is intercepted (or processed) by the functions in the pre-load library 318.

At block 410, the called function in the pre-load library 318 generates a selection request to the connectivity engine component 308 to select the appropriate radio for use by the application. The request includes any information that is part of the selection criteria used by the connectivity engine component 308 to select the appropriate radio for use by the application.

At block 412, selection criteria are assessed. In one implementation, the connectivity engine component 308 operates to assess the selection criteria described above. For example, the connectivity engine 308 communicates with the radio component 312 to assess radio metrics that are part of the selection criteria.

At block 414, a radio is selected based on the assessment of the selection criteria. For example, the connectivity engine component 308 operates to select the radio that best matches the selection criteria.

At block 416, the radio that has been selected is bound to the application. For example, in one implementation, the connectivity engine component 308 calls a Bind( ) function of the networking library 320 to bind the radio that has been selected to the application. For example, the connectivity engine component 308 is aware of the networking library 320 and how to access its functions directly without being intercepted by the pre-load library 318.

At block 418, the application then utilizes the radio that has been selected for network communications.

In an optional operation, the method proceeds to block 412 where the connectivity engine component 308 operates to perform periodic assessment of the selection criteria to determine if the current radio best matches the selection criteria. If it is determined after another assessment of the selection criteria that a radio other than the current radio best matches the selection criteria, then the connectivity engine 308 can destroy the connection as a means to trigger the application into restarting the connection to select a different radio for the new connection. Thus, the optional operation allows the selection criteria to be periodically assessed to assure that the most appropriate radio is selected to conduct the desired communication.

Therefore, the method 400 provides intelligent radio selection for use with legacy and non-legacy applications. It should be noted that the method 400 is just one implementation and that the operations of the method 400 may be rearranged or otherwise modified such that other implementations are possible.

Figure 5:
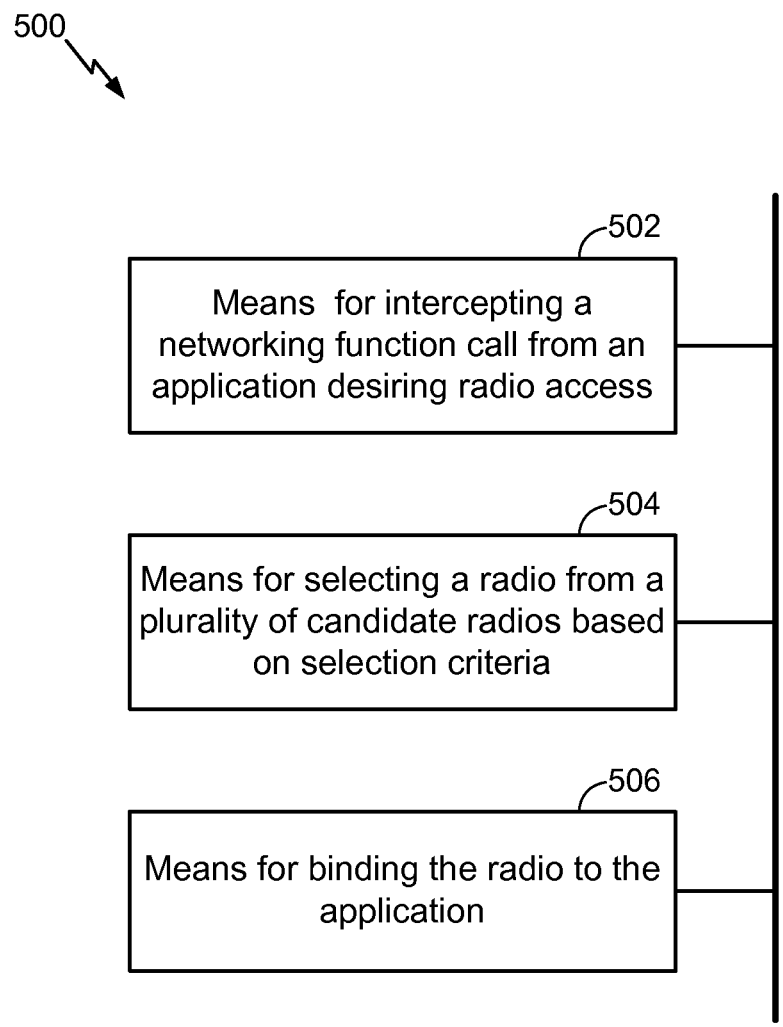
FIG. 5 shows an exemplary apparatus that provides intelligent radio selection.

FIG. 5 shows an exemplary apparatus 500 that provides intelligent radio selection. For example, the apparatus 500 is suitable for use as the device 102 shown in FIG. 1. In an aspect, the apparatus 500 is implemented by at least one integrated circuit comprising one or more modules configured to provide aspects of an intelligent radio selection system as described herein. For example, in an aspect, each module comprises hardware and/or hardware executing software.

The apparatus 500 comprises a first module comprising means (502) for intercepting a networking function call from an application desiring radio access, which in an aspect comprises the pre-load library 318.

The apparatus 500 also comprises a second module comprising means (504) for selecting a radio from a plurality of candidate radios based on selection criteria, which in an aspect comprises the connectivity engine module 308.

The apparatus 500 also comprises a third module comprising means (506) for binding the radio to the application, which in an aspect comprises the connectivity engine module 308.

In addition to intelligent interface selection, the system operates to provide flow mobility as described below.

Figure 6:
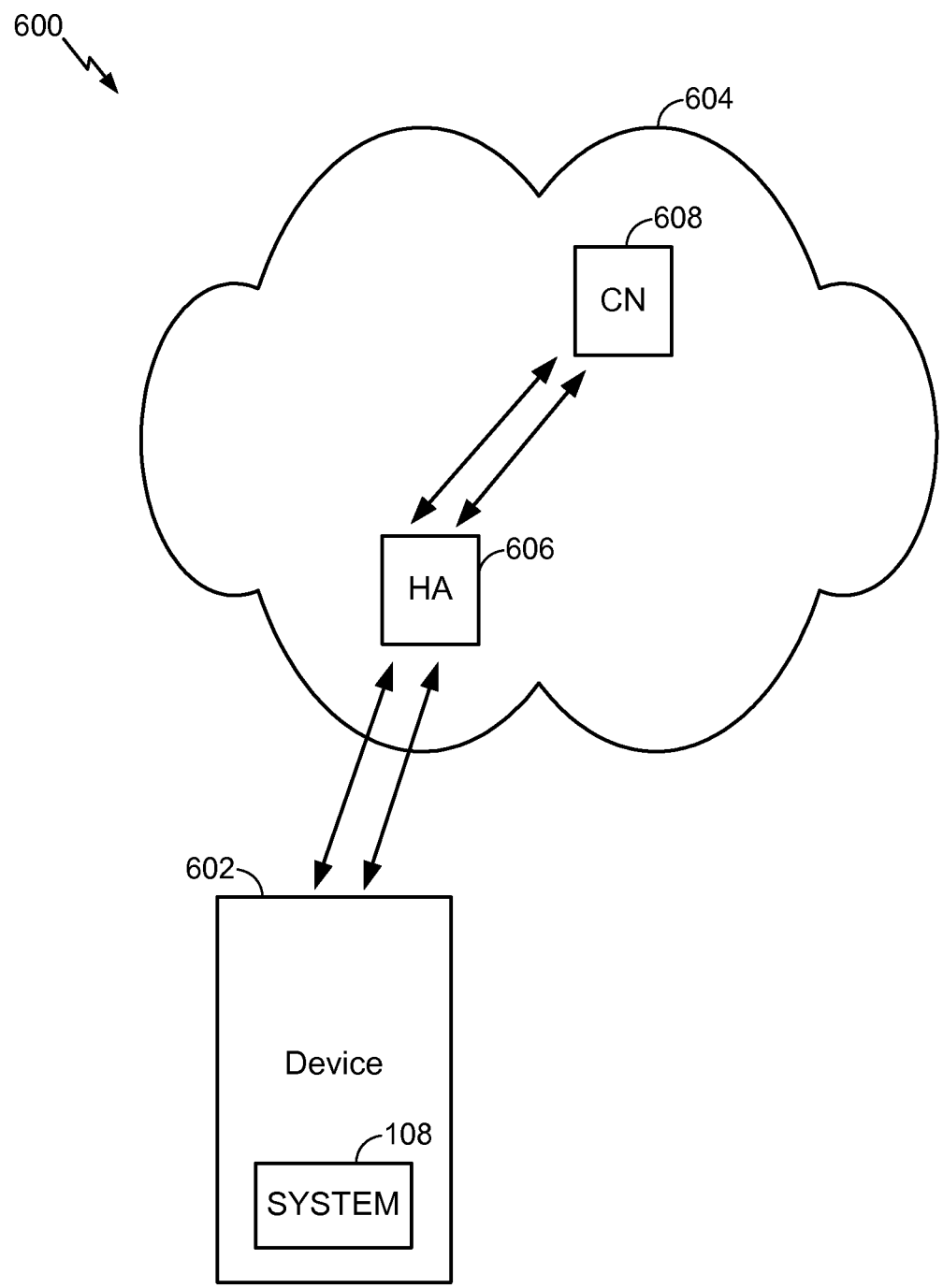
FIG. 6 shows an exemplary communication network that illustrates aspects of flow mobility provided by the intelligent radio selection system.

FIG. 6 shows an exemplary communication network 600 that illustrates aspects of flow mobility provided by the intelligent radio selection system. The communication network 600 comprises device 602 configured to communicate with network 604 using one or more communication interfaces 606. For example, the communication interfaces 606 comprise cellular, WiFi, Bluetooth and any other suitable communication technology.

During operation, an application at the device 602 generates a connection request to communicate with a network resource. As discussed above, the system 108 performs an intelligent interface selection to satisfy the request. To provide aspects of flow mobility, the system operate to dynamically generate a flow binding rule that specifies a particular communication interface selected from the interfaces 606 to encapsulate packets for routing between a home agent 608 and the device 602.

In conventional systems, the IP flow binding is usually described in a 5-tuple comprising a source IP address, destination IP address, source port, destination port, and protocol. Thus, this description is provided by the handset 602 to the home agent 608 and packets matching this description will be routed accordingly by the home agent 608. Unfortunately, registering flows using the 5-tuple may not be bandwidth efficient since all the elements of the 5-tuple are transmitted even though the only tuple that changes may be the source port.

In various implementations, the system operates to dynamically generate a flow binding rule when a connection is started so that a data flow can be transmitted over the most appropriate radio/interface. For example, in one implementation, the system allocates an ephemeral port to be used by the application for network communications. The system 108 then dynamically generates a flow binding rule based only on the ephemeral port which indicates that a particular data flow is to be associated with the ephemeral port and be transmitted on a particular radio/interface. By utilizing only the ephemeral port in the binding rule it is not necessary to transmit the entire 5-tuple to the home agent, which is more efficient than conventional systems since it saves transmission bandwidth.

In another implementation, an IPv6 address is dynamically generated for the connection. For example, a per connection IPv6 address belonging to the mobile node prefix is generated and assigned to the mobile IP address. Next, a flow binding rule based only on the per connection IPv6 address is dynamically generated.

In either of the above cases, the binding rule is then signaled to a home agent (HA) 608 on the network 604. The HA 608 operates to route packets to the device according to the binding rule. For example, data packets sent from a correspondent node (CN) 610 to the device are received at the HA 608 and then routed to the device 602 using the binding rule. The following methods describe aspects of flow mobility provided by the intelligent selection system.

Figure 7:
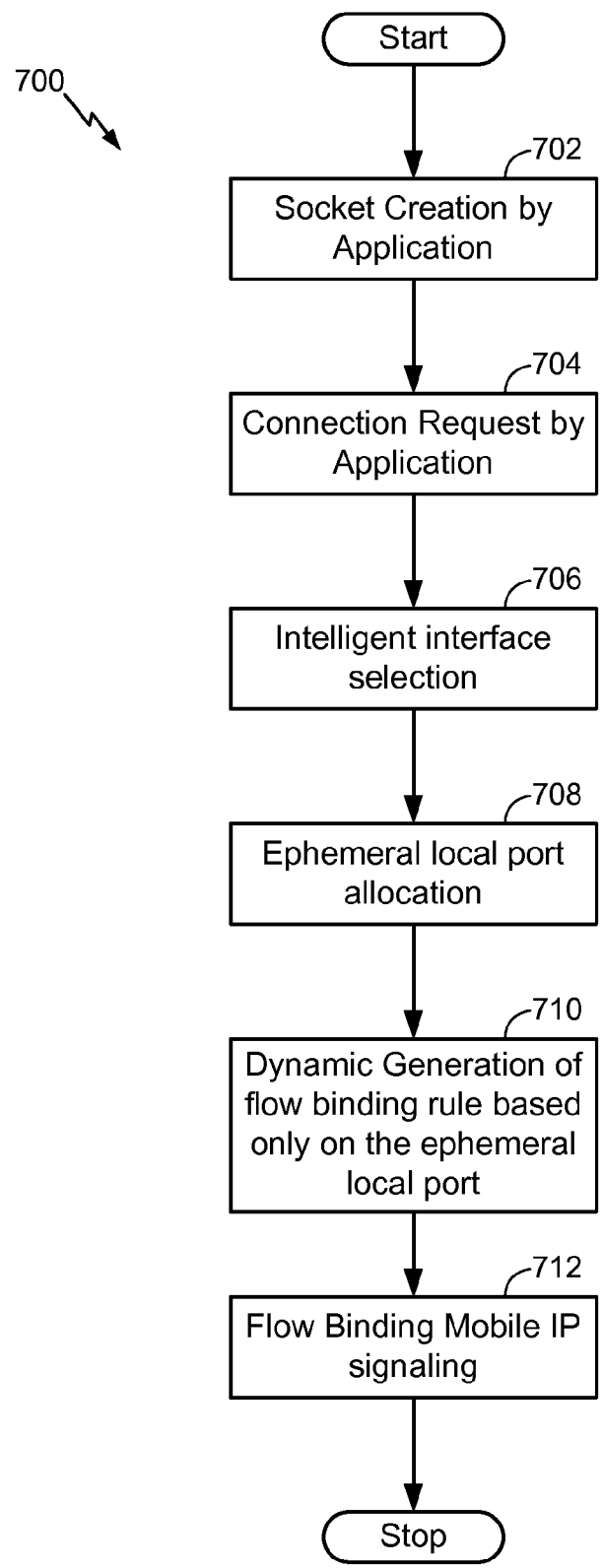
FIG. 7 shows an exemplary method for providing flow mobility.

FIG. 7 shows an exemplary method 700 for providing flow mobility. For clarity, the method 700 is described below with reference to the device 300 shown in FIG. 3 and the network 600 shown in FIG. 6. In one implementation, the processor 302 executes one or more sets of codes to control the functional elements of the device 300 to perform the functions described below.

At block 702, a socket is created by an application. For example, an application executing at the device 602 creates a socket to receive a data flow from a network resource that is part of the network 604.

At block 704, a networking function call from the application is intercepted. For example, the networking function call may be a POSIX socket function call, such as the Connect( ) function. The application generates the networking function call to connect to a radio to allow communication with external networks. Due to the linking of the pre-load library 318 into the execution environment at a higher priority than the networking library 320, the networking function call is intercepted (or processed) by the functions in the pre-load library 318.

At block 706, intelligent interface selection is performed to satisfy the networking function call. For example, blocks 408 to 414 of the method 400 are performed to select a radio/interface for use by the application. Thus, one of the interfaces 606 provided by the device 602 is selected for use by the application.

At block 708, an ephemeral local port is allocated. In one implementation, the connectivity engine 308 operates to allocate an ephemeral local port to the application. For example, an ephemeral (i.e., short-lived) port is a transport protocol port for IP communications that is selected from a pre-defined range. The allocation is temporary and only valid for the duration of the communication session. After completion of the communication session the port becomes available for reuse.

At block 710, a flow binding rule is dynamically generated based only on the ephemeral port. In one implementation, the connectivity engine 308 operates to dynamically generate the binding rule based only on the allocated ephemeral local port.

At block 712, the flow binding rule is signaled to a home agent associated with the device. For example, the connectivity engine 308 operates to transmit the flow binding rule to the home agent 608. The home agent 608 then uses the flow binding rule to route flows the device 602 using the appropriate radio/interface.

Therefore, the method 700 provides flow mobility in an intelligent radio selection system. It should be noted that the method 700 is just one implementation and that the operations of the method 700 may be rearranged or otherwise modified such that other implementations are possible.

Figure 8:
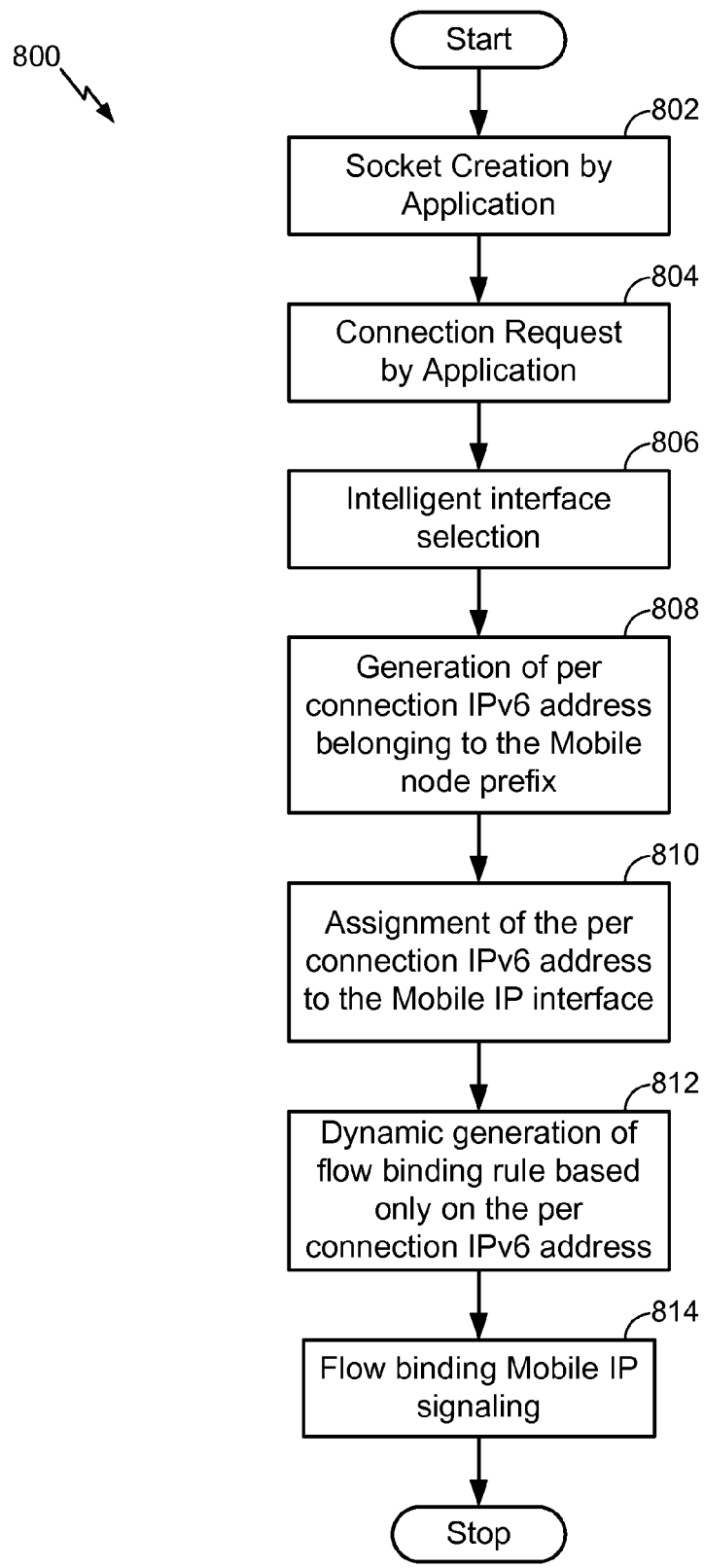
FIG. 8 shows an exemplary method for providing flow mobility.

FIG. 8 shows an exemplary method 800 for providing flow mobility. For clarity, the method 800 is described below with reference to the device 300 shown in FIG. 3 and the network 600 shown in FIG. 6. In one implementation, the processor 302 executes one or more sets of codes to control the functional elements of the device 300 to perform the functions described below.

At block 802, a socket is created by an application. For example, an application executing at the device 602 creates a socket to receive a data flow from a network resource that is part of the network 604.

At block 804, a networking function call from the application is intercepted. For example, the networking function call may be a POSIX socket function call, such as the Connect( ) function. The application generates the networking function call to connect to a radio to allow communication with external networks. Due to the linking of the pre-load library 318 into the execution environment at a higher priority than the networking library 320, the networking function call is intercepted (or processed) by the functions in the pre-load library 318.

At block 806, intelligent interface selection is performed to satisfy the networking function call. For example, blocks 408 to 414 of the method 400 are performed to select a radio/interface for use by the application. Thus, one of the interfaces 606 provided by the device 602 are selected.

At block 808, a per connection IPv6 address belonging to the mobile node prefix is generated. For example, the per connection IPv6 address is generated by the connectivity engine 308.

At block 810, the per connection IPv6 address is assigned to the mobile IP address. For example, the assignment is performed by the connectivity engine 308.

At block 812, a flow binding rule is dynamically generated based only on the per connection IPv6 address. In one implementation, the connectivity engine 308 operates to dynamically generate the binding rule based only on the per connection IPv6 address. This achieves efficient bandwidth utilization since other parameters, such as port or destination address are not necessary and would consume processing resources of the home agent.

At block 814, the flow binding rule is signaled to a home agent associated with the device. For example, the connectivity engine 308 operates to transmit the flow binding rule to the home agent 608. The home agent 608 then uses the flow binding rule to route flows the device 602 using the appropriate radio/interface.

Therefore, the method 800 provides flow mobility in an intelligent radio selection system. It should be noted that the method 800 is just one implementation and that the operations of the method 800 may be rearranged or otherwise modified such that other implementations are possible.

In user devices such as smartphones, personal digital assistants, etc., software applications may continue to operate even though the user is not actively using the device. Applications such as social networking applications, email or other communication applications, data feeds, etc. (popular examples include Facebook, Gmail, Market, Twitter, etc.) may continue to send and receive data even though a user is not using the device.

Figure 9:
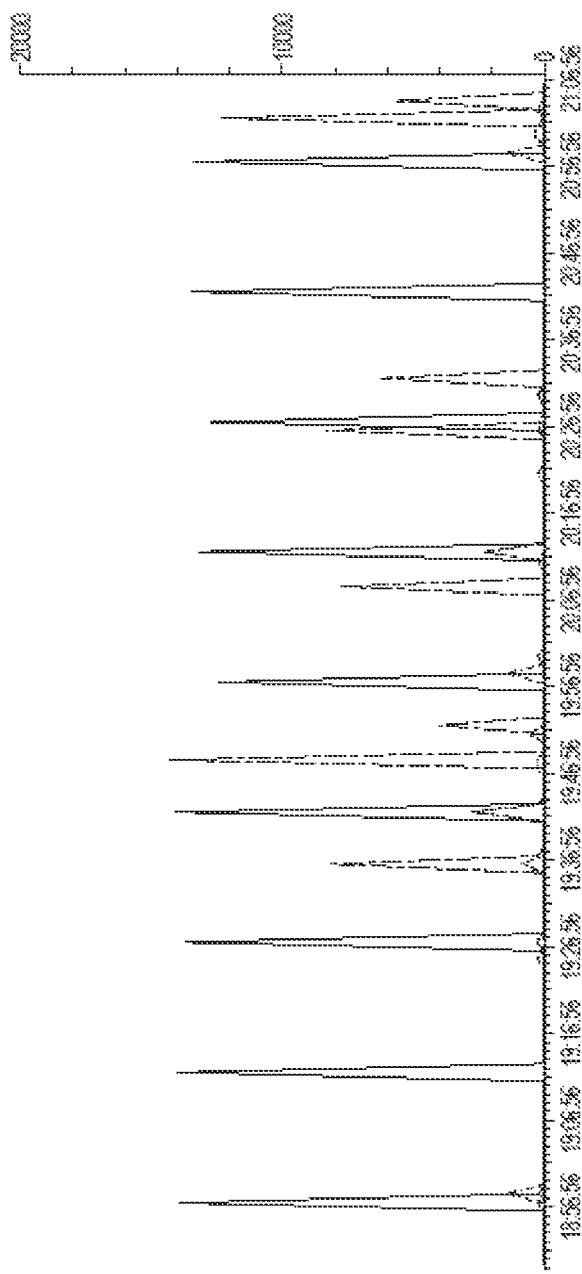
FIG. 9 shows an example of radio activity from a user device when not engaged by a user.

FIG. 9 shows sample levels of application activity for a user device during an approximate two-hour period during which the user does not interact with the device and the screen is off. As can be seen, even under such conditions, spikes in activity can be seen by applications that continue to operate even when the device is ostensibly not in use. The activity by these applications may utilize communication resources such as the radios in radio unit 208, etc.

Such applications may trigger frequent transitions by the user device from idle mode to connected mode, or they may otherwise interfere with the user device entering idle mode or other alternate connection modes such as discontinuous reception (DRX). Such elevate levels of radio activity by the applications when the user is not actively engaging the device may result in premature drain of battery life, undesired increased on the load of radio networks, or other undesired effects.

Employing the techniques and structures disclosed herein, a device may employ a layer (for illustrative purposes, called a wrapper) which provides an application program interface (API) to capture data from background applications and hold them until a desired point where radio resources may be activated and the application data transferred and tasks executed in a synchronized manner. By aggregating such tasks/data requests, frequent waking of the user device may be reduced and other communication resources conserved during periods where the user is not actively engaging with the device.

Figure 10:
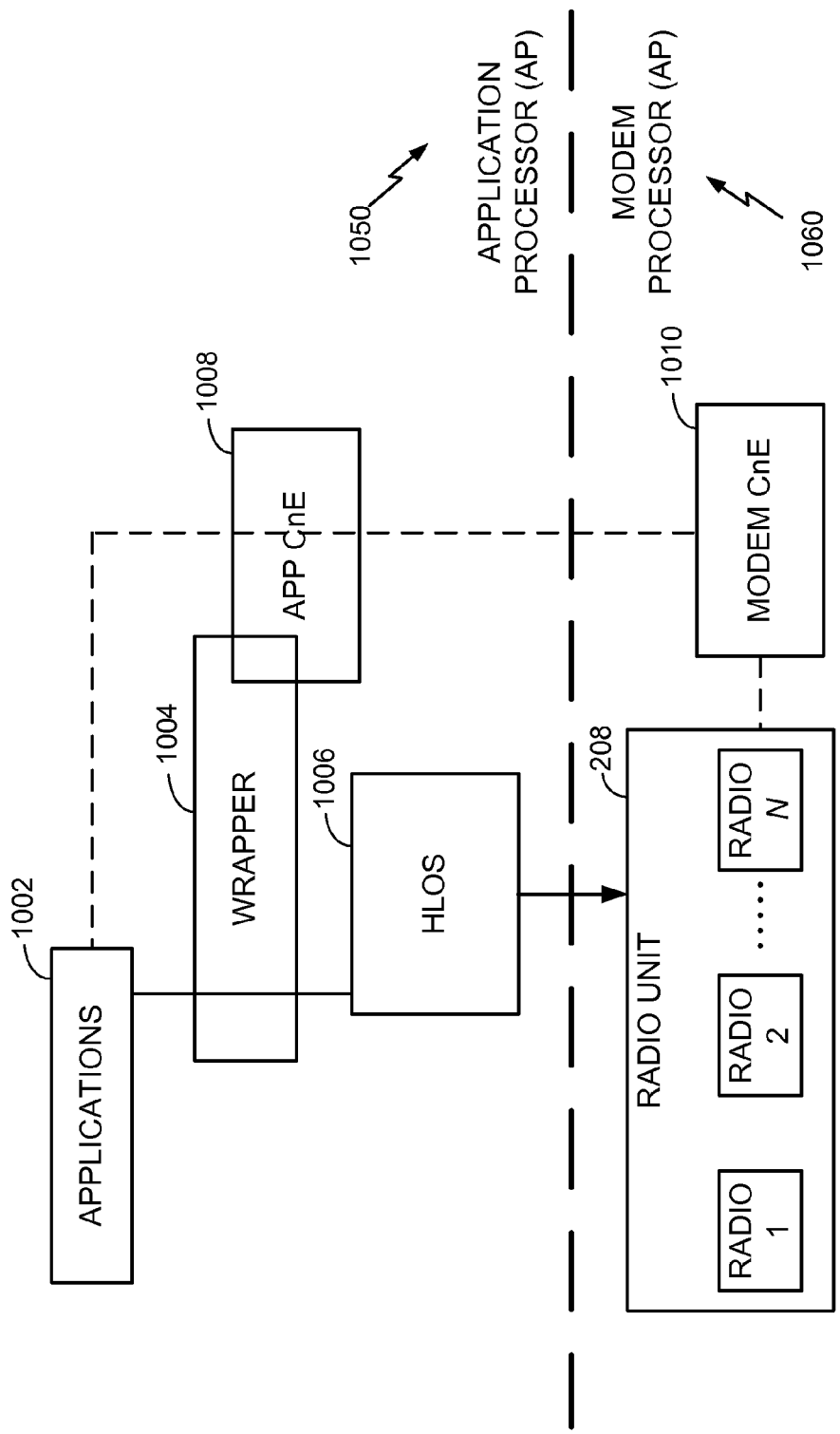
FIG. 10 shows an exemplary device architecture for delaying and aggregating application radio requests.

FIG. 10 shows a sample block diagram of architecture useful for aggregating application events as described above. As shown, the blocks are divided between an application processor 1050 and a modem processor 1060, but the various functionality may be organized differently from the example of FIG. 10. Applications 1002 interact with the application connection engine 1008 and with the high level operating system (HLOS) 1006. The application connection engine 1008 may communicate with a modem connection engine 1010. The modem connection engine may manage communication resources such as a radio unit 208 and the radios therein. The wrapper 1004 is capable of capturing data between the applications 1002 and the HLOS 1006. The wrapper 1004 may aggregate data from the applications 1002 during a period of user inactivity and hold them until a determined time before releasing them to the HLOS 1006 and ultimately the radio unit 208 for operation/transmission. In one aspect, the wrapper 1004 holds the captured data and then may evaluate whether the held data can be released. The data may be released based on the outcome of the evaluation. Both the time of the evaluation and the outcome of the evaluation may be based on various parameters, such as, but not limited to, air link efficiency, network indications, location, context awareness, time of the day, present network load, and past network load pattern.

The wrapper 1004 may be invisible to the applications 1002 such that they are unaware that their data/requests are being held/aggregated. The wrapper 1004 may be a separate component or may be incorporated into another component such as the application connection engine 1008.

Figure 11:
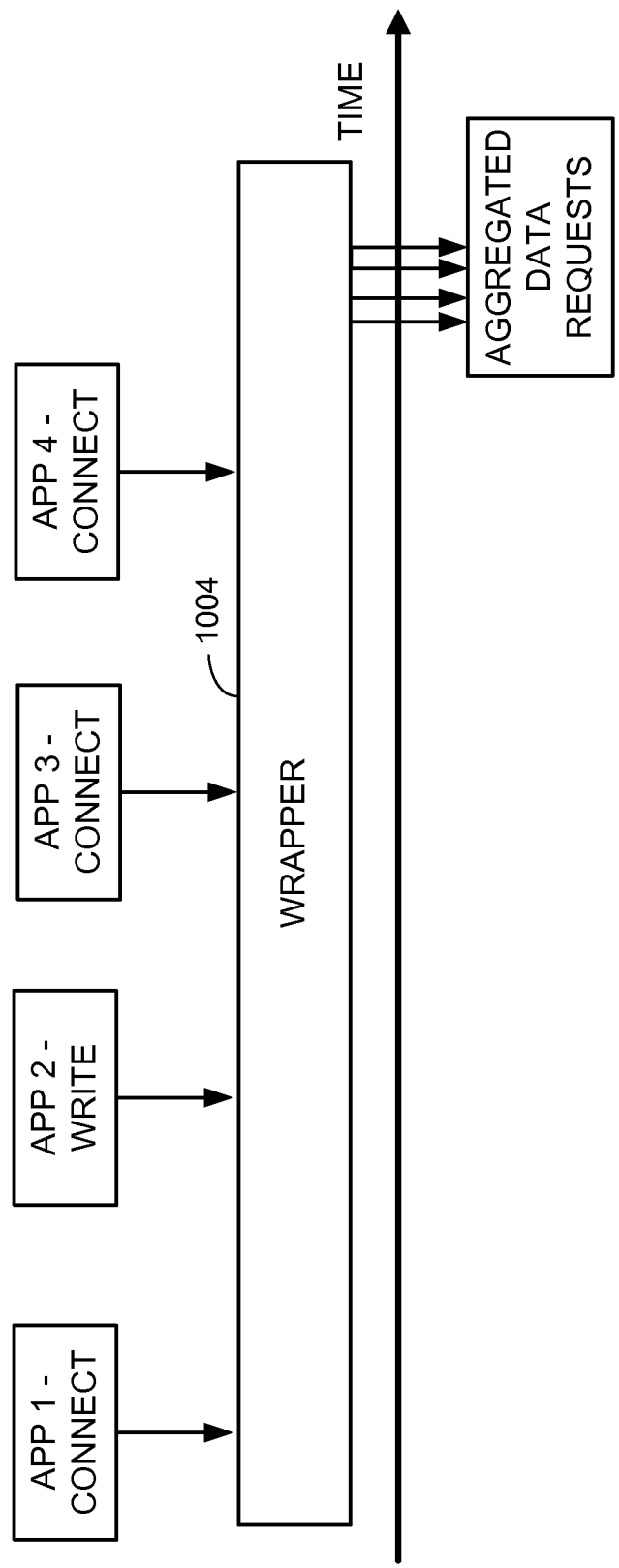
FIG. 11 shows an exemplary method for delaying and aggregating application radio requests.

An example of such aggregation is shown in FIG. 11. Applications 1 through 4 each make a request for use of a radio resource. Such socket calls may be captured and held by the wrapper 1004. At a determined time, the wrapper 1004 will release the socket calls in an aggregated manner. In one aspect, the wrapper 1004 evaluates whether to release the calls. The release is based on the outcome of the evaluation by the wrapper 1004. Both the time for evaluating and the outcome of the evaluation may be a function of various parameters, such as, but not limited to, air link efficiency, network indications, location, context awareness, time of the day, present network load, and past network load pattern.

Figure 12:
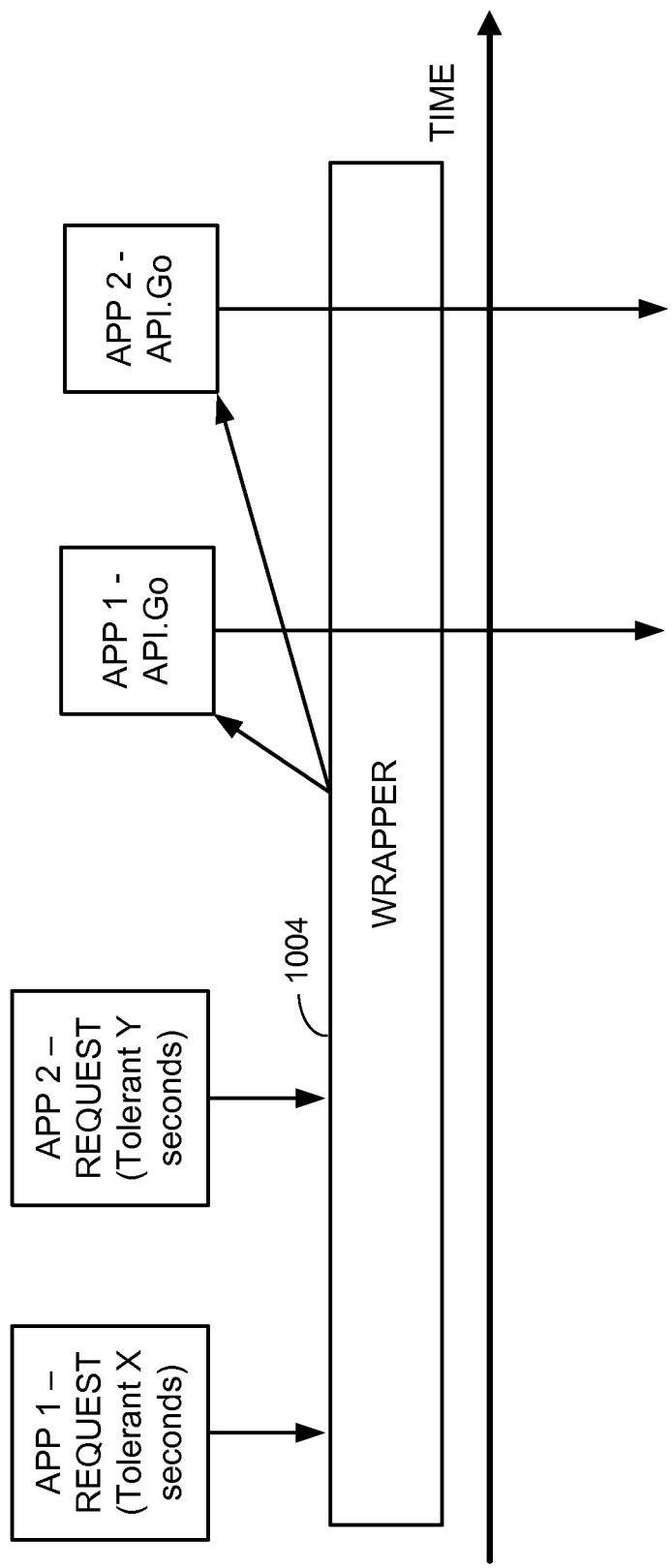
FIG. 12 shows an exemplary method for delaying and aggregating application radio requests.

In another aspect, shown in FIG. 12, a connection engine API (application program interface) to the applications may indicate their background activity/requirements for operation where certain applications may only be tolerant of certain delays (e.g., X seconds, Y seconds, etc.). The wrapper may provide a callback function to indicate to such applications that it is time to connect (e.g., API.Go). After receiving such a callback the applications may communicate as desired. Alternatively, the applications via the API may provide deadlines and the wrapper may transparently delay the connection while respecting the deadlines, and allowing the applications to connect prior to any deadlines.

In yet another aspect, the API may allow also an application to register that it needs immediate access (e.g., kid tracking, emergency notification, etc.). In general the wrapper can learn or read a database that indicates which process names are/are not delay-tolerant.

In still another aspect, operator policies allow control of the wrapper behavior based on a subscription. For example, a gold period is one minute, a pre-pay period is one hour, etc.

Aggregation and delay of applications may be done selectively, i.e., implemented such that a user may not be disrupted. A variety of factors may be employed to determine when to delay/aggregate applications' use of communication resources. For example, delay may be implemented based on certain characteristics of the user device such as the screen is off, or the audio output is off, etc. Delay may only be implemented for applications known to be able to handle such delays. Delay may be implemented when the radio is not loaded, when the user device/phone is not otherwise in use (no phone calls, audio streaming, etc.). Or delay may be implemented utilizing a combination of the factors above or other factors.

When applications installed on a number of user devices request access to a network at the same time (or within a short time period), the network may be overloaded by a peak network signaling associated with the setup of data connections. For example, automatic broadcast notifications programmed to occur at a fixed time of day (e.g., software updates, periodic updates of dynamic content, etc.) may cause a number of applications executing on a number of different user devices to request a data connection with the network. In one configuration, to prevent such synchronization, the time delay after which the held request is released may be computed based on a random number. In one configuration, the architecture may include a randomization timer that may be initiated when a request is intercepted. The timer may determine the random period of time to hold the request. When the random period of time has expired, the request may be released to the intended recipient. For example, the request may be released upon the expiration of the randomization timer. The random delay serves to desynchronize network signaling and data connection setup procedures across a number of user devices.

In one aspect, radio awareness may assist in reducing the number of application connections, which may ease the signaling load and/or save user device battery life. In another aspect, a variety of factors may be employed to both determine the time for evaluating whether the held request can be released and to determine the evaluation decision. In particular, various parameters representing air link efficiency, network indications, location, context awareness, time of the day, present network load, and past network load pattern, may be utilized to determine the time for evaluating and the evaluation decision.

The time for evaluating and the evaluation decision (or outcome) can both be functions of the time of the day. For example, the time for evaluating can be longer and the evaluation decision can favor not releasing the held request at certain times of the day when it is understood that the network is expected to be heavily loaded.

The time for evaluating and the evaluation decision can both be functions of the past network usage pattern over time. The past network usage patterns can be made available at the wrapper 1004 through, for example, download through the network, off-network download, etc.

According to an aspect of the present disclosure, the gate to the uplink is opened or closed based on network load. Network load may refer to the overall load of the radio system (control plane plus data plane), or the specific load of the control plane or user plane only. When the network load is lower, the gate is opened. When the network load is higher, the gate is closed. In one example, the network load is estimated by observing the load on the random access channel (RACH), and in particular by observing the RACH response. The RACH is available on most cellular networks and may be used to transport signaling messages. The RACH may be used by a terminal to transition from idle mode to active mode. The RACH may also be used to resynchronize while the terminal is in active mode. Generally, the load on the RACH correlates with the signaling load, because the RACH is the channel that carries radio resource control (RRC) controls during connection setup. For example in the LTE system, the RACH response is broadcast, and allows client A to see the responses for clients B, C, D, etc. In other words, even though a particular device is not accessing the random access channel, the same device may observe whether other devices are accessing the network via the RACH at the current time. As the channel is typically used for signaling, by observing the load on this channel (i.e., RACH), the user device may determine whether a heavy load exists due to signaling.

In one aspect, the wrapper 1004 periodically monitors the load on the RACH response channel and opens the gate when the overall load is low compared to a predetermined value, such as determined average load value. In one example, monitoring the RACH response channel allows the user device 102 of FIG. 1 to perform time-tolerant connections to the network 104 during periods of network low usage. Or in other words, multiple connections may be allowed into a period of low usage in the network 104. Random backoff may be used to distribute load if multiple user devices 102 employ a wrapper 1004 to monitor network load. For example, if multiple user devices 102 are waiting to access a network 104, then once a period of low usage is present, the devices 102 would be allowed staggered access to the network 104 in order to prevent a load burst. That is, a first user device will access the network at time 1, a second user device will access the network at time 2 (later than time 1), etc. In another aspect the load is inferred from metrics such as the carrier to noise ratio (Ec/N0), the received signal code power (RSCP), the terminal transmit power or the base station's Rise over Thermal (RoT).

In another aspect, application connectivity to the network is based upon air link efficiency. In particular, the air link capacity may be increased or maximized by allowing connectivity to the network when channel conditions are good or optimal. For example, the signal to noise ratio (SNR) may be monitored and access to the network not allowed when the SNR is below a predetermined threshold. In another example, air link efficiency may be increased or maximized by allowing connectivity based on the radio access technology (RAT) the user device is currently using. In particular, the gate is opened (e.g., network access is allowed) if a known fast RAT is employed. For example in a 3GPP type of deployment, the user device may support GSM, GPRS edge, HSPA and LTE. A trigger may be established that does not allow the gate to open unless the RAT is HSPA or LTE. This provides for only fast RAT connections, which would likely reduce or minimize loss during connectivity.

In yet another example of allowing connectivity based on air link efficiency, re-selection status may be observed. Reselection is when the user device switches autonomously from one serving node to a different serving node. In one example, application connectivity (i.e., opening of the gate) is not allowed if any signs are present that indicate reselection is about to occur. In particular, the reselection r (or any potential reselection) finishes before connectivity to the network is allowed. Optionally, in another example, early reselection may be forced. In another example, the wrapper 1004 may trigger additional radio measurements, such as intra-frequency measurements and/or inter-frequency measurements, in order to facilitate a reselection before the wrapper 1004 opens the gate to allow for connection to the network 104. The measurements may provide the serving cell with information to determine whether a handover could better carry the traffic.

In another aspect, the wrapper 1004 may monitor and track the load and then release the connection requests and allow for connections to the network when the load is low, (as compared to a known average load value) or when the load is lower than a known peak load value. As discussed above, the network load can be inferred and monitored by observing the RACH. Additionally, the network load may be inferred, and thus monitored, by other means, such as, but not limited to, downlink traffic to pilot ratio or other radio quantities, indication from the radio access network, and the number of effective users. For example, in an EVDO-advanced network, the base station may provide an indication to the user regarding the load in a unicast and/or broadcast signal.

In another aspect, connectivity may be allowed based on coexistence of the radio. For example, LTE and Bluetooth may interfere based on the carrier frequency of LTE. Additionally, LTE and WLAN may also interfere. In a particular example, if a user device is using Bluetooth or WLAN (and there is actual interference or expected interference) then the LTE gate remains closed and no connection to the network by the requesting application is allowed until the interfering radio is no longer used. In another example, the wrapper 1004 receives information from a coexistence manager when coexistence issues are present. In this example, the wrapper 1004 does not allow application connectivity to the network when coexistence issues are present.

In another aspect, application connectivity to the network 104 is based on a network indication received by the wrapper 1004. The indication can be an over the air indication used by the wrapper 1004 to determine when the connections to the network are allowed. In one example, the network may broadcast an indication when it is a good time for sending background traffic. In particular, the network carrier may have a limit on the number of connections for each minute, and the network may broadcast the number of available connections for each minute or the network may indicate an access probability factor that applies when applications request network connectivity while the device is in standby. In one configuration, the access is allowed if a random number generated is less than the access probability factor. The wrapper 1004 receives the broadcast and determines whether it can open the gate and allow a network connection to the application(s). In one example, a "go" bit is received by the wrapper 1004 and triggers the wrapper 1004 to open the gate and permit the requesting applications to access the network 104. The indication can be based on a cell, or a remote network controller region, depending on whether the base station or radio network controller (RNC) is the bottleneck. The "go" bit may be applicable to a single user, or to all users within a group of users, such as a paging group.

Application connectivity is decided based on the type of radio access network, such as for instance GPRS, EDGE, UMTS, HSPA, cdma 1x, EV-DO, LTE, Wi-Fi, Wi-Max, etc. The wrapper may be configured with information relative to each radio access type, for instance to avoid releasing connections on slower networks, e.g., (GPRS) or networks where the signaling is less efficient, e.g., (UMTS). Conversely the wrapper may release the connection when network offers cheap connectivity, such as WLAN.

The wrapper may use information from the modem, in particular about idle mode or connected mode mobility if the terminal is about to, or in the process of connecting to another serving cell. The wrapper may allow the re-selection, or handover process, to complete before releasing traffic. This may ensure the traffic is released while the radio connection is most suitable to transport this traffic. For instance if a re-selection from UMTS to LTE is happening, the wrapper may wait until the terminal is camped on LTE to initiate the connection.

The wrapper may command the modem to perform operations in order to speed up or optimize an upcoming radio connection. For instance while the modem camps on a given radio access technology (RAT) on a given frequency that may be suitable for camping, but not ideal for carrying a data connection, the wrapper indicates to the modem to perform an inter-frequency search for available RATs. The modem may also initiate a re-selection to a better RAT/frequency in order to prepare for the wrapper opening the gate. Such procedure facilitates carrying the traffic on a more suitable carrier/RAT without the network initiating a handover in connected mode.

In another aspect, application connectivity to the network 104 is based upon a prediction of available network resources. In one aspect, the wrapper 1004 is location/context aware by receiving inputs such as, but not limited to, the time of day, motion state, fingerprint of cellular base station identities (example, device receives pilots from cells x, y and z and the received power is about −80, −65, −120 dBm), geo-location, list of known access points and locations. The geo location may be provided by a satellite system, such as GPS, or based on a fingerprint of cellular network cell ID, or based on presence of wireless local area network access points. The wrapper uses the location/context awareness to predict when another RAT will become available. In another aspect, the wrapper 1004 learns what times during the day there will be abundant access to the network and its resources. The wrapper uses the abundance information to determine when to open the gate and allow applications to connect to the network. For example, the user device may predict the user is headed home where a WLAN connection is available. In this case, the wrapper 1004 prevents communications to the network for delay tolerant applications until the user arrives home and the faster network becomes available.

Figure 13:
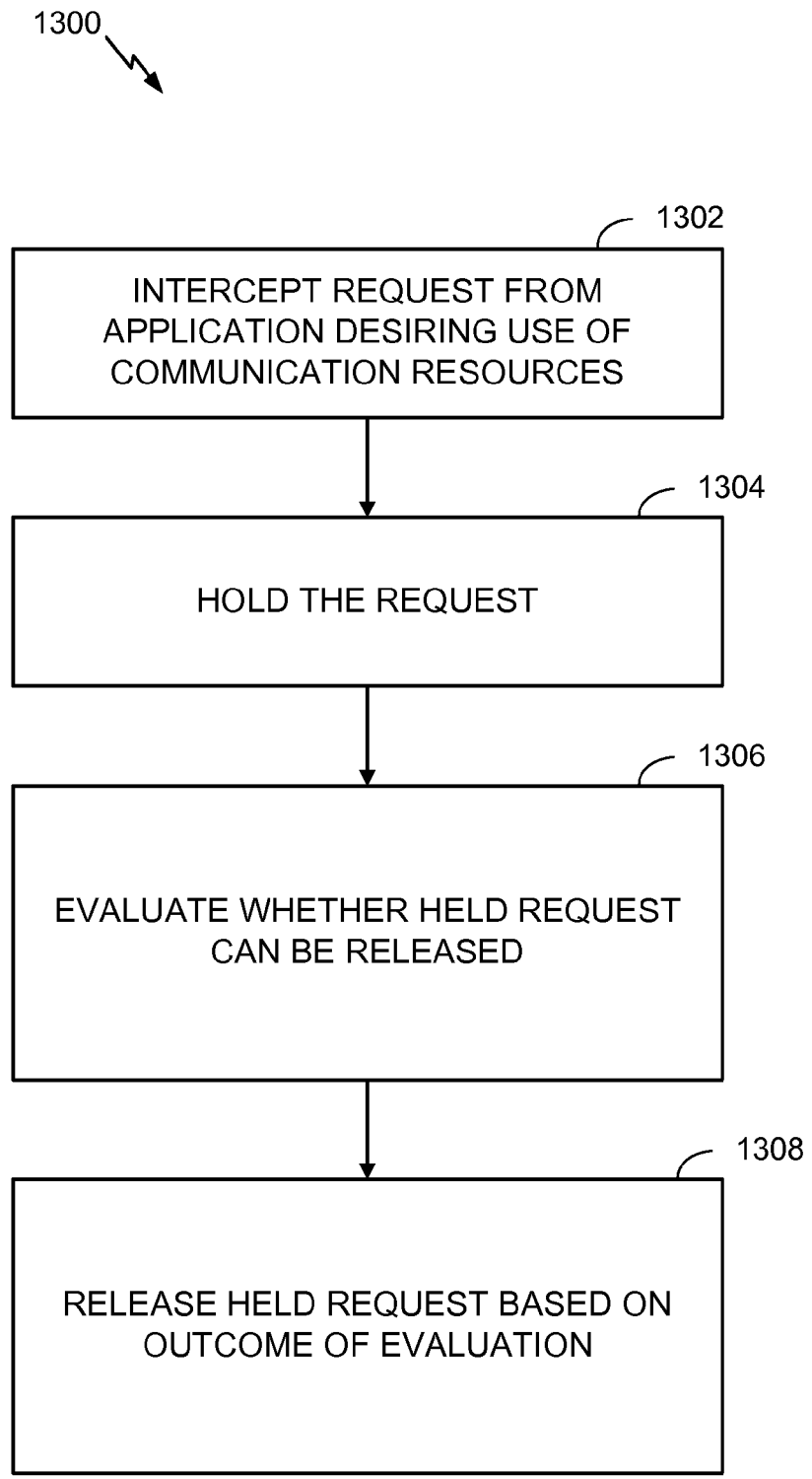
FIG. 13 illustrates a method for controlling application access to a network.

In one aspect, a method 1300 for controlling application access in wireless communication in a user device is illustrated in FIG. 13. At block, 1302 a request is intercepted from an application desiring use of communication resources. The request is held at block 1304. At block 1306, it is evaluated whether the held request can be released. At block 1308, the request is released based on an outcome of the evaluation.

Although the preceding description was with respect to an API, the concepts equally apply in hardware, firm ware, or any combination of hardware and software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. A method comprising:
   receiving, at a mobile device, first delay tolerance information associated with a first application executable at the mobile device, wherein the first delay tolerance information indicates that the first application tolerates a first amount of communication delay;
   intercepting a request from the first application during executing of the first application at the mobile device, the request for access to a communication resource of the mobile device;
   holding the intercepted request for a delay period that is determined based on the first amount of communication delay;
   and
   releasing the held request after the delay period.

2. The method of claim 1, further comprising holding a second intercepted request for a second delay period that is determined based on a prediction that the mobile device is to experience a handover from a first serving network node to a second serving network node, a prediction that a particular radio access technology (RAT) is to become available at the mobile device, or a combination thereof.

3. The method of claim 1, further comprising estimating a network load based on a random access response channel.

4. The method of claim 1, further comprising estimating a network load based on at least one of a downlink traffic to pilot ratio (TPR), a carrier to noise ratio, or a number of effective users.

5. The method of claim 1, further comprising holding a second intercepted request for a second delay period that is determined based on interference at a first radio of the mobile device due to operation of a second radio of the mobile device.

6. The method of claim 1, further comprising:
   receiving second delay tolerance information associated with a second application executable at the mobile device, wherein the second delay tolerance information indicates that the second application tolerates a second amount of communication delay that is different from the first amount of communication delay;

intercepting a second request from the second application; and holding the second request for a second delay period that is determined based on the second amount of communication delay.

7. The method of claim 1, further comprising:

receiving second delay tolerance information associated with a second application executable at the mobile device, wherein the second delay tolerance information indicates that the second application does not tolerate communication delay; and in response to the second delay tolerance information, refraining from holding requests from the second application.

8. The method of claim 1, further comprising receiving information indicating a communication deadline associated with a second application executable at the mobile device;

intercepting a second request from the second application; and holding the second request for a second delay period that is determined based on the communication deadline.

9. The method of claim 1, further comprising holding a particular intercepted request from a particular application based on a paid subscription level.

10. The method of claim 1, further comprising instructing a modem to perform at least one of an inter-frequency search operation or an inter-radio access technology (RAT) inter-frequency reselection operation in preparation for releasing the held request.

11. An apparatus comprising:

a memory; and at least one processor coupled to the memory and configured to:

receive first delay tolerance information associated with a first application executable at a mobile device, wherein the first delay tolerance information indicates that the first application tolerates a first amount of communication delay;

intercept a request from the first application during execution of the first application at the mobile device, the request for access to a communication resource of the mobile device;

hold the intercepted request for a delay period that is determined based on the first amount of communication delay; and and release the held request after the delay period.

12. The apparatus of claim 11, wherein the processor is further configured to hold a second intercepted request for a second delay period that is determined based on a prediction that the mobile device is to experience a handover from a first serving network node to a second serving network node, a prediction that a particular radio access technology (RAT) is to become available at the mobile device, or a combination thereof.

13. The apparatus of claim 11, in which the processor is further configured to estimate a network load based on a random access response channel.

14. The apparatus of claim 11, in which the processor is further configured to estimate a network load based on at least one of a downlink traffic to pilot ratio (TPR), a carrier to noise ratio, or a number of effective users.

15. The apparatus of claim 11, wherein the processor is further configured to hold a second intercepted request for a second delay period that is determined based on interference at a first radio of the mobile device due to operation of a second radio of the mobile device.

16. The apparatus of claim 11, wherein the processor is further configured to:

receive second delay tolerance information associated with a second application executable at the mobile device, wherein the second delay tolerance information indicates that the second application tolerates a second amount of communication delay that is different from the first amount of communication delay;

intercept a second request from the second application; and hold the second request for a second delay period that is determined based on the second amount of communication delay.

17. The apparatus of claim 11, wherein the processor is further configured to:

receive second delay tolerance information associated with a second application executable at the mobile device, wherein the second delay tolerance information indicates that the second application does not tolerate communication delay; and in response to the second delay tolerance information, refrain from holding requests from the second application.

18. The apparatus of claim 11, wherein the processor is further configured to:

receive information indicating a communication deadline associated with a second application executable at the mobile device;

intercept a second request from the second application; and hold the second request for a second delay period that is determined based on the communication deadline.

19. The apparatus of claim 11, wherein the processor is further configured to hold a particular intercepted request from a particular application based on a paid subscription level.

20. The apparatus of claim 11, wherein the processor is further configured to instruct a modem to perform at least one of an inter-frequency search operation or an inter-radio access technology (RAT) inter-frequency reselection operation in preparation for releasing the held request.

21. An apparatus comprising:

means for receiving, at a mobile device, first delay tolerance information associated with a first application executable at the mobile device, wherein the first delay tolerance information indicates that the first application tolerates a first amount of communication delay;

means for intercepting a request from the first application during execution of the first application at the mobile device, the request for access to a communication resource of the mobile device;

means for holding the intercepted request for a delay period that is determined based on the first amount of communication delay;

and means for releasing the held request after the delay period.

22. A computer program product comprising a non-transitory computer-readable medium having non-transitory program code recorded thereon, the program code to:

receive, at a mobile device, first delay tolerance information associated with a first application executable at the mobile device, wherein the first delay tolerance information indicates that the first application tolerates a first amount of communication delay;

intercept a request from the first application during execution of the first application at the mobile device, the request for access to a communication resource of the mobile device;
hold the intercepted request for a delay period that is determined based on the first amount of communication delay;
and
release the held request after the delay period.

* * * * *